United States Patent
Shin et al.

(10) Patent No.: US 7,073,956 B1
(45) Date of Patent: Jul. 11, 2006

(54) OPTICAL TRANSCEIVER AND PASSIVE OPTICAL NETWORK USING THE SAME

(75) Inventors: Dong-Jae Shin, Suwon-si (KR); Chang-Sup Shim, Seoul (KR); Seong-Taek Hwang, Pyeongtaek-si (KR); Dae-Kwang Jung, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 11/185,040

(22) Filed: Jul. 20, 2005

(30) Foreign Application Priority Data

Dec. 29, 2004 (KR) .................... 10-2004-0115373

(51) Int. Cl.
*G02B 6/36* (2006.01)

(52) U.S. Cl. ........................................... 385/89

(58) Field of Classification Search .............. None
See application file for complete search history.

(56) References Cited

U.S. PATENT DOCUMENTS

| | | | | |
|---|---|---|---|---|
| 5,983,068 A | * | 11/1999 | Tomich et al. ............ | 725/32 |
| 6,038,357 A | * | 3/2000 | Pan ............................ | 385/24 |
| 6,415,074 B1 | * | 7/2002 | Donald et al. ............. | 385/24 |
| 6,674,968 B1 | * | 1/2004 | Xie ............................ | 398/79 |
| 2002/0076144 A1 | * | 6/2002 | Tai et al. ................... | 385/24 |
| 2002/0141020 A1 | * | 10/2002 | Doucet et al. ............ | 359/172 |
| 2002/0186435 A1 | * | 12/2002 | Shpantzer et al. ........ | 359/136 |
| 2003/0031404 A1 | * | 2/2003 | Pedersen ................... | 385/24 |
| 2004/0151425 A1 | * | 8/2004 | Wu et al. ................... | 385/24 |

\* cited by examiner

*Primary Examiner*—Michelle Connelly-Cushwa
*Assistant Examiner*—Chris Chu
(74) *Attorney, Agent, or Firm*—Cha & Reiter, L.L.C.

(57) ABSTRACT

Disclosed are an optical transceiver and a passive optical network using the same. The optical transceiver includes a polarization splitter for splitting injected light input from an outside of the optical transceiver into a first polarization component and a second polarization component, a light injected transmitter for receiving the first polarization component and outputting an optical signal generated based on the first polarization component, and an optical receiver for detecting an electrical signal based on the second polarization component.

20 Claims, 5 Drawing Sheets

OPTICAL TRANSCEIVER AND PASSIVE OPTICAL NETWORK USING THE SAME

CLAIM OF PRIORITY

This application claims priority to an application entitled "Optical Transceiver and Passive Optical Network Using The same," filed in the Korean Intellectual Property Office on Dec. 29, 2004 and assigned Serial No. 2004-115373, the contents of which are incorporated herein by reference.

BACKGROUND OF THE INVENTION

1. Field of the Invention

The present invention relates to an optical transceiver (TRX), and more particularly to an optical transceiver including a light injected transmitter and a passive optical network (PON) using the same.

2. Description of the Related Art

Increasing interest in a wavelength division multiplexed passive optical network (WDM-PON) as a next generation subscriber network for providing future broadband communication services resulted in efforts to produce WDM-PON economically. Since WDM-PON allocates a separated wavelength to each subscriber, it requires a plurality of light sources and a wavelength division multiplexer (WDM) for multiplexing/de-multiplexing plural wavelength channels. In the WDM-PON, it is important to economically array wavelengths between these light sources and the WDM in order to reduce maintenance costs. Several suggestions of employing distributed feedback laser arrays, high power light emitting diode arrays, and spectrum-sliced light sources as the light sources have been made. Recently, a suggestion has been made to use a light injection-type light sources that determine output wavelengths by having light injected from outside. The suggestion intends to exploit the fact that such light sources can be maintained easily. Some examples of the light injection-type light sources include Fabry-Perot laser diodes (FP-LDs) and reflective semiconductor optical amplifiers (R-SOAs). One benefit of using light injection-type light sources is that wavelength of the light from the light sources need not be adjusted, for their wavelengths are determined by injected light. Accordingly, it becomes unnecessary to array the wavelengths between the light sources and the WDM, and it becomes simple to achieve and maintain network operation. Meanwhile, the WDM-PON has advantages such as a great bandwidth, superior security, and protocol independence. However, the WDM-PON is not widely used due to the high price of optical transceivers and the transmission difficulty of broadcasting data.

Figure 1:
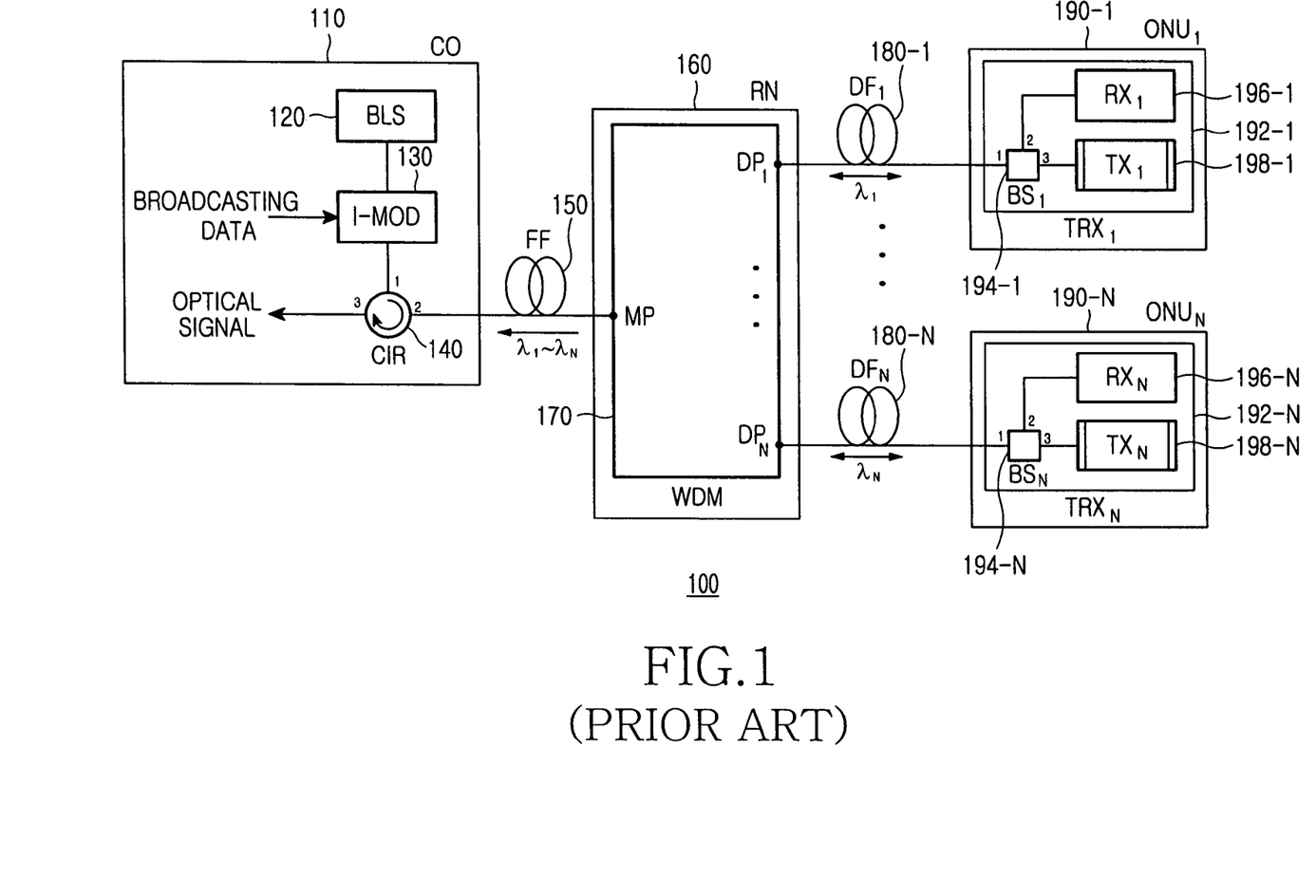
FIG. 1 is a block diagram showing a structure of a typical WDM-PON.

FIG. 1 is a block diagram showing a structure of a typical WDM-PON 100. The WDM-PON 100 includes a central office (CO) 110, a remote node (RN) 160 connected to the CO 110 through feeder fiber (FF) 150, and a plurality of optical network units (ONU) 190-1 to 190-N connected to the RN 160 through a plurality of distribution fibers (DF) 180-1 to 180-N. The CO 110 transmits broadband light (BL) to the RN 160 by intensity-modulating the broadband light based on broadcasting data, and the RN 160 spectrum-divides the modulated broadband light. Each ONU 190-1 to 190-N power-divides corresponding spectrum-divided lights and outputs optical signals, some of which are employed as electrical signals and others as injected light. Herein, the spectrum division refers to the operation of dividing light to a plurality of wavelength components, and the power division refers to the operation of dividing light regardless of wavelengths. The optical signals have wavelengths $\lambda$ where the first wavelength has a wavelength $\lambda_1$ and the $N^{th}$ optical signal has the $N^{th}$ wavelength $\lambda_N$.

The CO 110 includes a broadband light source (BLS) 120, an intensity-modulator (I-MOD) 130, and a circulator (CIR) 140.

The broadband light source 120 outputs a non-polarized incoherent broadband light. The broadband light source 120 may include an erbium doped amplifier (EDFA) having an erbium doped fiber (EDF) for amplifying spontaneous emission light, a laser diode for outputting pumping light for pumping the erbium doped fiber, and a wavelength selective coupler (WSC) for providing the pumping light to the erbium doped fiber.

The intensity-modulator 130 modulates the intensity of the broadband light, received from the broadband light source 120, based on input broadcasting data and outputs the broadband light. Generally, the intensity-modulator 130 may include a Mach-Zehnder modulator.

The circulator 140 includes three ports. The first port is connected to the intensity-modulator 130, and the second port is connected to the feeder fiber 150. The circulator 140 outputs the broadband light received by the first port to the second port and outputs multiplexed optical signal received by the second port to the third port. The circulator 140 represents a device that outputs light received from a certain port to the following port (the first port→the second port, the second port→the third port). Light received by the third port is extinguished.

The RN 160 includes a wavelength division multiplexer (WDM) 170.

The WDM 170 includes a multiplexing port (MP) and a plurality of de-multiplexing ports (DP). The multiplexing port is connected with the feeder fiber 150, and each de-multiplexing port makes one-to-one connection with respective distribution fibers 180-1 to 180-N. Accordingly, the $N^{th}$ de-multiplexing port is connected with the $N^{th}$ distribution fiber. The WDM 170 spectrum-divides the modulated broadband light received by the multiplexing port and outputs the modulated broadband lights to respective de-multiplexing ports. Accordingly, the WDM 170 outputs $N^{th}$ spectrum-divided light to the $N^{th}$ de-multiplexing port. In addition, the WDM 170 wavelength division multiplexes a plurality of optical signals received by the respective de-multiplexing ports and outputs the optical signals to the multiplexing port.

Each ONU 190-1 to 190-N has one-to-one connection with the respective distribution fibers 180-1 to 180-N, and each ONU includes optical transceivers 192-1 to 192-N. Accordingly, the $N^{th}$ ONU 190-N, a representative of all ONU, is connected with the $N^{th}$ distribution fiber 180-N and includes the $N^{th}$ optical transceiver 192-N.

The $N^{th}$ optical transceiver 192-N includes an $N^{th}$ beam splitter (BS) 194-N, an $N^{th}$ optical receiver (RX) 196-N, and an $N^{th}$ light injected transmitter (TX) 198-N.

The $N^{th}$ beam splitter (BS) 194-N includes three ports, where the first port to the third ports are connected with the $N^{th}$ distribution fiber 180-N, the $N^{th}$ optical receiver (RX) 196-N, and the $N^{th}$ light injected transmitter (TX) 198-N, respectively. The $N^{th}$ beam splitter (BS) 194-N power-divides the $N^{th}$ spectrum-divided light received by the first port to first and second power-divided lights. The first power-divided light is output to the second port, and the second power-divided light is output to the third port. Also, the $N^{th}$ beam splitter 194-N outputs the $N^{th}$ optical signal received by the third port to the first port. The $N^{th}$ beam splitter 194-N may include a Y-branch wave-guide.

The $N^{th}$ optical receiver 196-N is connected with the second port of the $N^{th}$ beam splitter (BS) 194-N and detects an electrical signal related to the first power-divided light from the $N^{th}$ beam splitter 194-N. The $N^{th}$ optical receiver 196-N may include a photodiode.

The $N^{th}$ light injected transmitter 198-N is connected with the third port of the $N^{th}$ beam splitter 194-N. The transmitter 198-N outputs the $N^{th}$ optical signal that is generated by the second power divided light from the $N^{th}$ beam splitter 194-N and that is modulated based on non-broadcasting data. The $N^{th}$ light injected transmitter 198-N may include a Fabry-Perot laser diode (FP-LD) or a reflective semiconductor optical amplifier (R-SOA).

Hereinafter, a procedure for processing an optical signal in the WDM-PON 100 will be described. Broadband light generated from the broadband light source (BLS) 120 of the CO 110 is intensity-modulated in the intensity-modulator 130 based on broadcasting data, and the modulated broadband light is received by the WDM 170 of the RN 160 through the circulator 140 and the feeder fiber 150. The WDM 170 spectrum-divides the input broadband light to create a plurality of spectrum-divided lights. Each ONU 190-1 to 190-N power-divides corresponding spectrum-divided light. Each ONU then detects electrical signals based on a portion of the power-divided light and output, as injected light, respective optical signal using remaining portion of the power-divided light. Meanwhile, the WDM 170 multiplexes and outputs received a plurality of optical signals. Herein, the multiplexed optical signal is transmitted to the CO 110 through the feeder fiber 150.

In a typical WDM-PON 110, a portion of power of corresponding spectrum-divided light provided to each ONU is used for receiving broadcasting data. Accordingly a light injection efficiency is lowered. In addition, the intensity of injected light changes according to time due to the intensity-modulation based on broadcasting data. Such change in light intensity allows the output of the light injected transmitter to become unstable over time.

SUMMARY OF THE INVENTION

One aspect of the present invention is to provide an optical transceiver and a passive optical network using the same that can maintain the intensity of injected light received by a light injected transmitter. The transceiver with uniform intensity, compared to conventional transceivers, can greatly improve the light injection efficiency while providing broadcasting data and the injected light to each optical network unit.

In one embodiment, an optical transceiver includes: a polarization splitter for splitting injected light received from an outside of the optical transceiver into a first polarization component and a second polarization component; a light injected transmitter for receiving the first polarization component and outputting an optical signal generated based on the first polarization component; and an optical receiver for detecting an electrical signal based on the split second polarization component.

In another embodiment, an optical transceiver includes: a wavelength division filter for separating injected light and a first optical signal received from outside of the optical transceiver; a polarization splitter for splitting the separated injected light into a first polarization component and a second polarization component; a light injected transmitter for receiving the first polarization component and outputting a second optical signal generated based on the first polarization component; a first optical receiver for detecting an electrical signal based on the split second polarization component; and a second optical receiver for detecting an electrical signal based on the first optical signal.

Another embodiment is a passive optical network. The passive optical network includes: a central office for outputting upstream broadband light processed through non-intensity modulation based on broadcasting data; a remote node for outputting the upstream broadband light by spectrum-dividing the input upstream broadband light; and a plurality of optical network units for inputting corresponding spectrum-divided light, wherein each of the optical network units includes: a polarization splitter for splitting input spectrum-divided light into a first polarization component and a second polarization component; a light injected transmitter for receiving the split first polarization component and outputting an upstream optical signal generated based on the first polarization component; and an optical receiver for detecting an electrical signal based on the second polarization component.

In another embodiment, a passive optical network includes: a central office for outputting upstream broadband light processed through non-intensity modulation based on broadcasting data and for outputting multiplexed downstream optical signal processed through modulation based on non-broadcasting data; a remote node for spectrum-dividing and outputting the input upstream broadband light and wavelength division de-multiplexing and outputting the input multiplexed downstream optical signal; and a plurality of optical network units for receiving corresponding spectrum-divided light and downstream optical signal, wherein each of the optical network units includes: a wavelength division multiplexing filter for dividing the input spectrum-divided light and the downstream optical signal; a polarization splitter for splitting the divided spectrum-divided light into a first polarization component and a second polarization component; a light injected transmitter for receiving first polarization component and outputting an upstream optical signal generated based on the first polarization component; a first optical receiver for detecting an electrical signal based on the split second polarization component; and a second optical receiver for detecting an electrical signal based on the split downstream optical signal.

BRIEF DESCRIPTION OF THE DRAWINGS

The above features and advantages of the present invention will be more apparent from the following detailed description taken in conjunction with the accompanying drawings, in which.

DETAILED DESCRIPTION

Hereinafter, embodiments of the present invention will be described in detail with reference to the accompanying drawings. Note that same or similar components in drawings are designated by the same reference numerals as far as possible even if they are shown in different drawings. For the purposes of clarity and simplicity, a detailed description of known functions and configurations incorporated herein will be omitted as it may make the subject matter of the present invention rather unclear.

Figure 2:
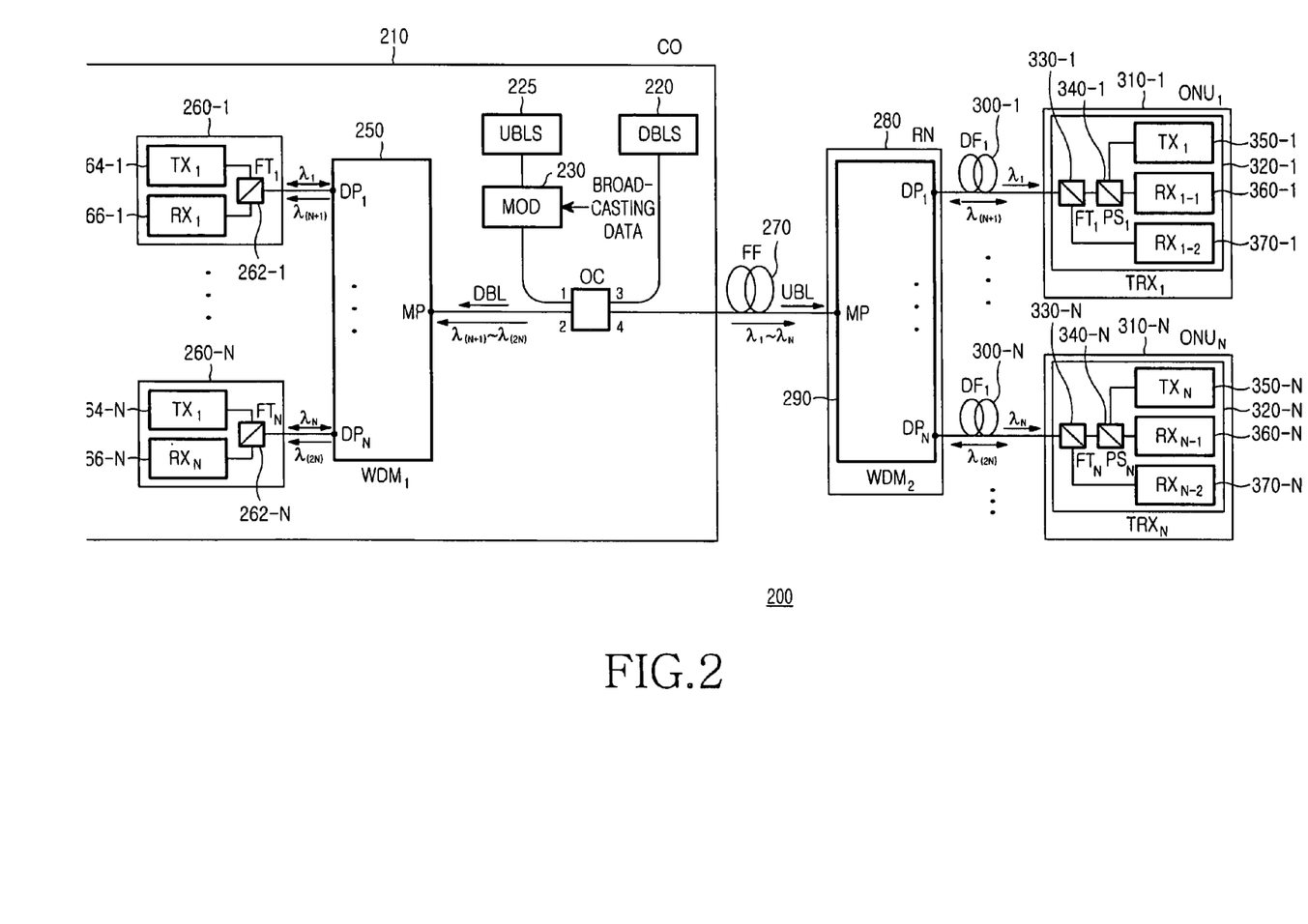
FIG. 2 is a block diagram showing a structure of a WDM-PON according to an embodiment of the invention.

FIG. 2 is a block diagram showing a structure of a wavelength division multiplexed passive optical network (WDM-PON) 200, an embodiment of the invention. The WDM-PON 200 includes a central office (CO) 210, a remote node (RN) 280 connected with the CO 210 through feeder fiber (FF) 270, and a plurality of optical network units (ONU) 310-1 to 310-N connected with the RN 280 through respective distribution fibers (DF) 300-1 to 300-N. The CO 210 performs non-intensity modulation for upstream broadband light based on broadcasting data and transmits the upstream broadband light to the RN 280. As RN 280 receives the upstream broadband light from CO 210, it spectrum-divides the light. Each ONU 310-1 to 310-N polarization-splits respective spectrum-divided light, de-modulates broadcasting data by detecting an electrical signal based on the second polarization component, generates the first polarization component based on injected light, and outputs corresponding upstream optical signals modulated based on non-broadcasting data. The detection of the polarization components may be accomplished by photodiodes. In non-intensity modulation, the bit levels "0" and "1" are expressed as phases "C" and "D" (phase modulation) or frequencies "E" and "F" (frequency modulation), respectively, rather than intensity levels "A" and "B", respectively. Each downstream optical signal has wavelength λ where the first downstream optical signal has first wavelength $\lambda_1$ and $N^{th}$ downstream optical signal has the $N^{th}$ wavelength $\lambda_N$. Meanwhile, each upstream optical signal has (N+1) wavelength where first upstream optical signal has a wavelength $\lambda_{N+1}$, and the $N^{th}$ upstream optical signal has the $2N^{th}$ wavelength $\lambda_{2N}$.

The CO 210 includes a plurality of optical transceivers 260-1 to 260-N, a first wavelength division multiplexer ($WDM_1$) 250, an upstream broadband light source (UBLS) 225, a downstream broadband light source (DBLS) 220, an optical modulator (MOD) 230, and an optical coupler (OC) 240.

Each of the optical transceiver 260-1 to 260-N includes a downstream light injected transmitter (DTX), an upstream optical receiver (URX), and a WDM filter. Accordingly, the $N^{th}$ optical transceiver 260-N includes the $N^{th}$ downstream light injected transmitter 264-N, the $N^{th}$ upstream optical receiver 266-N, and the $N^{th}$ WDM filter 262-N.

The $N^{th}$ downstream light injected transmitter 264-N receives the $N^{th}$ downstream spectrum-divided light from the $N^{th}$ WDM filter 262-N and outputs the $N^{th}$ downstream optical signal. The signal is generated by the $N^{th}$ downstream spectrum-divided light and modulated based on non-broadcasting data. Each of the downstream light injected transmitters 264-1 to 264-N may include a Fabry-Perot laser diode (FP-LD) or a reflective semiconductor optical amplifier (R-SOA).

The $N^{th}$ upstream optical receiver 266-N receives an $N^{th}$ upstream optical signal from the $N^{th}$ WDM filter 262-N. The $N^{th}$ upstream optical receiver 266-N de-modulates non-broadcasting data carried by the $N^{th}$ upstream optical signal by detecting an electrical signal based on the $N^{th}$ upstream optical signal. Each of the upstream optical receiver 266-1 to 266-N may include a photodiode to detect optical signals.

The $N^{th}$ WDM filter 262-N receives the $N^{th}$ downstream spectrum-divided light and the $N^{th}$ upstream optical signal from the $N^{th}$ de-multiplexing port of the first $WDM_1$ 250. The $N^{th}$ WDM filter 262-N outputs the $N^{th}$ downstream spectrum-divided light to the $N^{th}$ downstream light injected transmitter 264-N, and the filter 262-N outputs the $N^{th}$ upstream optical signal to the $N^{th}$ upstream optical receiver 266-N. In addition, the $N^{th}$ WDM filter 262-N outputs the $N^{th}$ downstream optical signal received from the $N^{th}$ downstream light injected transmitter 264-N to the $N^{th}$ de-multiplexing port of the first $WDM_1$ 250.

The first $WDM_1$ 250 includes a multiplexing port and a plurality of de-multiplexing ports. The first $WDM_1$ 250 creates a plurality of downstream spectrum-divided lights by spectrum-dividing downstream broadband light received by the multiplexing port. The first $WDM_1$ 250 then outputs each downstream spectrum-divided light to respective de-multiplexing ports. In addition, the first $WDM_1$ 250 wavelength division de-multiplexes a multiplexed upstream optical signal into a plurality of upstream optical signals and outputs the multiplexed upstream optical signals to respective de-multiplexing ports. The $WDM_1$ 250 wavelength division multiplexes each downstream optical signal received by respective de-multiplexing port and outputs each downstream optical signal to the multiplexing port. The $WDM_1$ 250 may include an arrayed wave-guide grating (AWG). Herein, the spectrum division refers to an operation of dividing light by selectively passing light having a corresponding wavelength component, and the wavelength division de-multiplexing refers to an operation of simply dividing a plurality of wavelength components.

The downstream broadband light source 220 outputs non-polarized incoherent downstream broadband light. The downstream broadband light source 220 may include an erbium doped fiber amplifier (EDFA) having an erbium doped fiber (EDF) for outputting amplified spontaneous emission light, a laser diode for outputting pumping light for pumping the erbium doped fiber, and a wavelength selective coupler for providing the pumping light to the erbium doped fiber.

The upstream broadband light source 225 outputs non-polarized incoherent upstream broadband light. The upstream broadband light source 225 may include an erbium doped amplifier having an erbium doped fiber for outputting amplified spontaneous emission light, a laser diode for outputting pumping light for pumping the erbium doped fiber, and a wavelength selective coupler for providing the pumping light to the erbium doped fiber.

The optical modulator 230 performs non-intensity modulation to the upstream broadband light from the upstream broadband light source 225 based on input broadcasting data, and it outputs the upstream broadband light. The optical modulator 230 may include a typical Mach-Zehnder modulator.

The optical coupler 240 includes four ports. The first port to the fourth port are linked with the optical modulator 230, the multiplexing port of the first WDM 250, the downstream broadband light source 220, and the feeder fiber 270, respectively. The optical coupler 240 outputs the modulated upstream broadband light received by the ports, outputs the downstream broadband light received by the third port to the second port, outputs the multiplexed downstream optical signal received by the second port to the fourth port, and outputs the multiplexed upstream optical signal received by the fourth port to the second port. The optical coupler 240 may include a typical directional optical coupler.

The RN 280 includes a second $WDM_2$ 290.

The second $WDM_2$ 290 includes a multiplexing port and a plurality of de-multiplexing ports. The multiplexing port is linked with the feeder fiber 270, and each de-multiplexing port has one-to-one connection with respective distribution fiber 300-1 to 300-N. Accordingly, the $N^{th}$ de-multiplexing port is linked with the $N^{th}$ distribution fiber 300-N. The second $WDM_2$ 290 generates a plurality of upstream spectrum-divided lights by spectrum-dividing the modulated upstream broadband light received by the multiplexing port, and it outputs each upstream spectrum-divided light to respective de-multiplexing ports. In addition, the second $WDM_2$ 290 wavelength division de-multiplexes the multiplexed downstream optical signal received by the multiplexing port into a series of downstream optical signals and outputs the de-multiplexed downstream optical signal to respective de-multiplexing ports. Furthermore, the $WDM_2$ 290 wavelength division multiplexes a series of upstream optical signals received by each de-multiplexing port and outputs each upstream optical signal to the multiplexing port. The second $WDM_2$ 290 may include an arrayed waveguide grating.

Each ONU 310-1 to 310-N has one-to-one connection with respective distribution fibers 300-1 to 300-N, and each ONU 310-1 to 310-N includes an optical transceiver. Accordingly, $N^{th}$ ONU 310-N is linked with the $N^{th}$ distribution fiber 300-N and includes the $N^{th}$ optical transceiver 320-N.

The $N^{th}$ optical transceiver 320-N within $N^{th}$ ONU 310-N includes an $N^{th}$ WDM filter 330-N, an $N^{th}$ polarization splitter (PS) 340-N, an $N^{th}$ upstream light injected transmitter (UTX) 350-N, and $(N-1)^{th}$ and $(N-2)^{th}$ downstream optical receivers (DRXs) 360-N and 370-N.

The $N^{th}$ WDM filter 330-N receives the $N^{th}$ upstream spectrum-divided light and the $N^{th}$ downstream optical signal from the $N^{th}$ de-multiplexing port of the second $WDM_2$ 290 through the $N^{th}$ distribution fiber 300-N. The $N^{th}$ WDM filter 330-N then outputs the $N^{th}$ upstream spectrum-divided light to the $N^{th}$ polarization splitter 340-N and the $N^{th}$ downstream optical signal to the $(N-2)^{th}$ downstream optical signal receiver 370-N. Furthermore, the $N^{th}$ WDM filter 330-N outputs the $N^{th}$ upstream optical signal received from the $N^{th}$ polarization splitter 340-N to the $N^{th}$ de-multiplexing port of the second $WDM_2$ 290.

The $(N-2)^{th}$ downstream optical receiver 370-N de-modulates non-broadcasting data carried by the $N^{th}$ downstream optical signal. The $(N-2)^{th}$ downstream optical receiver 370-N de-modulates the data by detecting an electrical signal based on the $N^{th}$ downstream optical signal received from the $N^{th}$ WDM filter 330-N. The $(N-1)^{th}$ and $(N-2)^{th}$ downstream optical receivers 360-N and 370-N, along with all other optical receivers, may include photodiodes that detect the optical signal.

The $N^{th}$ polarization splitter 340-N splits the $N^{th}$ upstream spectrum-divided light from the $N^{th}$ WDM filter 330-N into a first and second polarization components orthogonal to one another. The $N^{th}$ polarization splitter 340-N outputs the first polarization component to the $N^{th}$ upstream light injected transmitter 350-N and outputs the second polarization component to the $(N-1)^{th}$ optical receiver 360-N. The first polarization component has a polarization direction representing the highest polarization-dependent gain of the $N^{th}$ upstream light injected transmitter 350-N. The $N^{th}$ polarization splitter 340-N outputs the $N^{th}$ upstream optical signal, received from the $N^{th}$ upstream light injected transmitter 350-N, to the $N^{th}$ WDM filter 330-N.

The $(N-1)^{th}$ downstream optical receiver 360-N de-modulates non-broadcasting data carried by the second polarization component. It demodulates the second polarization component by detecting an electrical signal related to the second polarization component received from the $N^{th}$ polarization splitter 340-N.

The $N^{th}$ upstream light injected transmitter 350-N outputs the $N^{th}$ upstream optical signal (having the same wavelength as the first polarization component) that is generated by the first polarization component received from the $N^{th}$ polarization splitter 340-N. The $N^{th}$ upstream light injected transmitter 350-N may include a Fabry-Perot laser diode (FP-LD) or a reflective semiconductor optical amplifier (R-SOA). The $N^{th}$ upstream light injected transmitter 350-N outputs the $N^{th}$ upstream optical signal modulated based on applied non-broadcasting data. The $N^{th}$ upstream light injected transmitter 350-N has a gain depending on a polarization direction of input light. This is because the $N^{th}$ upstream light injected transmitter 350-N has a quantum wall structure, and the gain varies according to the quantum wall structure. The $N^{th}$ upstream light injected transmitter 350-N has gain distribution according to polarization directions centralized in a direction representing the maximum gain. Since the first polarization component has the direction representing the highest polarization-dependent gain of the $N^{th}$ upstream light injected transmitter 350-N, input power reduction by the $N^{th}$ polarization splitter 340-N has no influence on the output of the upstream light injected transmitter 350-N.

Hereinafter, a procedure of processing a downstream optical signal in the PON 200 will be described. The downstream broadband light source 220 outputs downstream broadband light to the first WDM 250 of the CO 210 through the optical coupler 240. The first $WDM_1$ 250 spectrum-divides the downstream broadband light into a plurality of downstream spectrum-divided lights. Each optical transceiver 260-1 to 260-N outputs corresponding downstream optical signals that is generated by the corresponding spectrum-divided light and modulated based on non-broadcasting data. The first $WDM_1$ 250 wavelength division multiplexes and outputs each of the received downstream optical signals. The multiplexed downstream optical signal is sent to the second $WDM_2$ 290 of the RN 280 through the optical coupler 240 and the feeder fiber 270. The second $WDM_2$ 290 wavelength division de-multiplexes and outputs the multiplexed downstream optical signal that it received. Each ONU 310-1 to 310-N receives corresponding downstream optical signals.

Hereinafter, a procedure of processing an upstream optical signal in the PON 200 will be described. Upstream broadband light from the upstream broadband light source 225 is processed through non-intensity modulation based on broadcasting data by the optical modulator 230. The modulated upstream broadband light is received by the second $WDM_2$ 290 through the optical coupler 240 and the feeder fiber 270. The second $WDM_2$ 290 spectrum-divides the upstream broadband light into a plurality of upstream spectrum-divided lights. Each ONU 310-1 310-N splits corresponding upstream spectrum-divided light into first and second polarization components; de-modulates non-broadcasting data carried by the second polarization component by detecting electrical signals based on the component; and outputs corresponding upstream optical signal generated based on the first polarization component. Detection of the second polarization component may be achieved by photodiodes. The second $WDM_2$ 290 wavelength division multiplexes and outputs received upstream optical signals. The multiplexed upstream optical signal is then sent to the first WDM₁ 250 through the feeder fiber 270 and the optical coupler 240. The first WDM₁ 250 wavelength division de-multiplexes and outputs the received multiplexed upstream signal. Each optical transceivers 260-1 to 260-N of the CO 210 receives respective upstream optical signals.

The optical transceiver included in each ONU may be constructed according to the need of a particular situation, and, hereinafter, various structures of the optical transceiver will be suggested.

Figure 3:
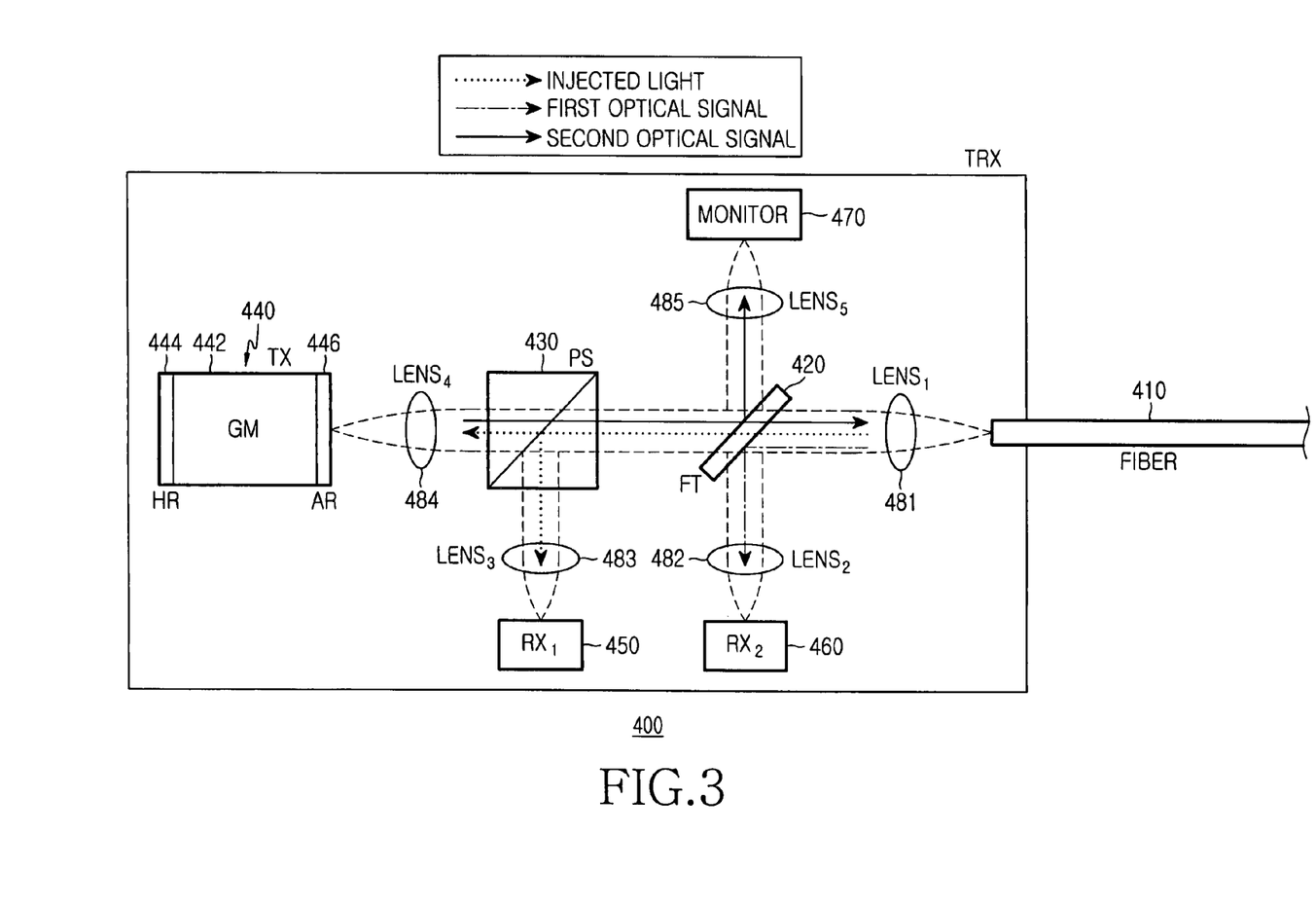
FIG. 3 is a view showing a structure of an optical transceiver according to another embodiment of the invention.

FIG. 3 shows an optical transceiver 400, an embodiment of the invention. The optical transceiver 400 includes a light injected transmitter (TX) 440, five lenses comprising a first lens to a fifth lens 481 to 485, a polarization splitter 430, a WDM filter (FT) 420, a first optical receiver and a second optical receiver (RX) 450 and 460, and a monitor 470.

The first lens 481 collimates the injected light and the first optical signal output from the end part of an external fiber 410. The first lens 481 also collects the second optical signal input from the WDM filter 420 to the end part of the optical fiber 410. The first lens to the fifth lens 481 to 485 may include a convex lens.

The WDM filter 420 reflects the first optical signal from the first lens 481 toward the second optical receiver 460 and allows the injected light from the first lens 481 to pass through the filter 420 toward the polarization splitter 430. In addition, the WDM filter 420 divides a second optical signal from the polarization splitter 430 at a predetermined ratio to generate first power-divided light and second power-divided light. The WDM filter 420 reflects the second power-divided light toward the fifth lens 485 and transmits the first power-divided light toward the first lens 481. It is preferred that the WDM filter 420 has a reflectance of 90% to 100% with respect to the first optical signal and a reflectance of 0.1% to 10% with respect to the second optical signal.

The second lens 482 collects the first optical signal received from the WDM filter 420. The second optical receiver 460 receives the collected first optical signal to detect an electrical signal related to the optical signal and de-modulates non-broadcasting data carried by the first optical signal.

The polarization splitter 430 splits the injected light from the WDM filter 420 to first and second polarization components. The polarization splitter 430 allows the first polarization component to pass through the splitter 430 toward the fifth lens 484 while reflecting the second polarization component toward the third lens 484. In addition, the polarization splitter 430 transmits the second optical signal from the fourth lens 484 toward the WDM filter 420.

The third lens 483 collects the second polarization component from the polarization splitter 430, and the first optical receiver 450 receives the collected second polarization component. The first optical receiver 450 detects an electrical signal related to the optical signal and de-modulate broadcasting data carried by the second polarization component. The detection of the optical signal may be achieved by a photodiode.

The fourth lens 484 collects the first polarization component from the polarization splitter 430. In addition, the fourth lens 484 collimates the second optical signal from the light injected transmitter 440 and outputs the second optical signal toward the polarization splitter 430.

The light injected transmitter 440 receives the collected first polarization component. In addition, the light injected transmitter 440 outputs the second optical signal (having the same wavelength as the first polarization component) generated by the first polarization component toward the fourth lens 484. The light injected transmitter 440 includes a gain medium (GM) 442 having an active layer and a high reflection layer (HR) 444 and an antireflection layer (AR) 446 formed on both ends of the gain medium 442. Herein, the antireflection layer (AR) 446 is opposed to the fourth lens 484. The light injected transmitter 440 outputs the second optical signal modulated based on non-broadcasting data applied to the gain medium 442. The gain of the light injected transmitter 440 varies depending on polarization directions of input light. Gain distribution of the light injected transmitter 440, according to the polarization directions, is centralized in a polarization direction representing the maximum gain. The first polarization component has a polarization direction representing the highest polarization-dependent gain of the N light injected transmitter 440. Moreover, input power reduction by the polarization splitter 430 has little influence on the output of the light injected transmitter 440. When a Fabry-Perot laser diode is used as the light injected transmitter 440, it is preferred that reflectance of the high reflection layer 444 and the antireflection layer 446 are 60% to 100% and 0.1% to 30%, respectively. In addition, when a reflective semiconductor optical amplifier is used as the light injected transmitter 440, it is preferred that reflectance of the high reflection layer 444 and the antireflection layer 446 are 60% to 100% and 0% to 0.1%, respectively.

The fifth lens 485 collects the second power-divided light reflected from the WDM filter 420, and the monitor 470 receives the collected second power-divided light. The monitor 470 detects electrical signal related to the second power-divided light, detects the power of the second optical signal, based on the power of the electrical signal, and monitors an operation state of the light injected transmitter 440.

Hereinafter, a procedure of processing an optical signal of the optical receiver 400 will be described. The first optical signal output from the optical fiber 410 is sent to the WDM filter 420 through the first lens 481. Then, the first optical signal is reflected by the WDM filter 420 and sent to the second optical receiver 460 through the second lens 482. The second optical receiver 460 detects an electrical signal of the first optical signal and de-modulates non-broadcasting data carried by the first optical signal.

The injected light sent from the optical fiber 410 is received by the polarization splitter 430 through the first lens 481 and the WDM filter 420. The polarization splitter 430 splits the injected light into first and second polarization components, allows the first polarization component to pass through the splitter 430 toward the fourth lens 484, and reflects the second polarization component toward the third lens 483. The second polarization component, having passed through the third lens 483, is received by the first optical receiver 450. The first optical receiver 450 detects the electrical signal related to the second polarization component and de-modulates broadcasting data carried by the second polarization component. The first polarization component is sent to the light injected transmitter 440 through the fourth lens 484. The light injected transmitter 440 outputs a second optical signal that is generated by the first polarization component and modulated based on non-broadcasting data. The second optical signal is sent to the WDM filter 420 through the fourth lens 484 and the polarization splitter 430. The WDM filter 420 power-divides the input second optical signal into first and second power-divided lights. The first power-divided light is transmitted toward the first lens 481, and the second power-divided light is reflected toward the fifth lens 485. The reflected second power-divided light is received by the monitor 470 through the fifth lens 485. The monitor 470 detects an electrical signal related to the second power-divided light, thereby monitoring the operation state of the light injected transmitter 440. The first power-divided light is sent to the optical fiber 410 through the first lens 481.

Figure 4:
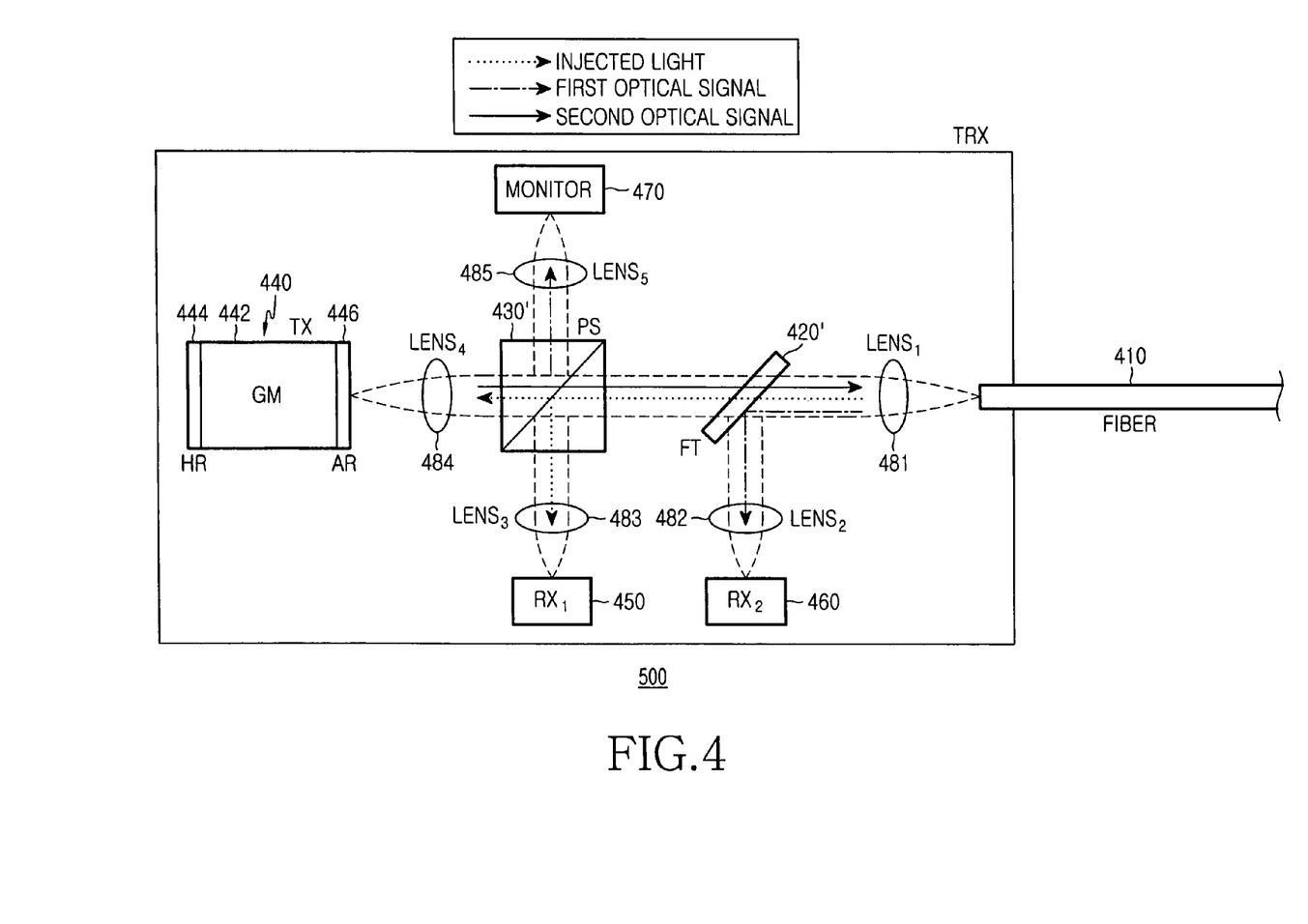
FIG. 4 is a view showing a structure of an optical transceiver according to another embodiment of the invention.

FIG. 4 shows a structure of an optical transceiver 500 according to another embodiment of the invention. Although positions of the fifth lens 485 and the monitor 470 and functions of a polarization splitter 430' and a WDM filter 420' are different from those shown in FIG. 3, the optical transceiver 500 has a structure similar to that shown in FIG. 3. Accordingly, redundant description will be omitted, and the same components will be designated by the same reference numerals. The optical transceiver 500 includes the light injected transmitter 440, the first lens to the fifth lens 481 to 485, the polarization splitter 430', the WDM filter 420', the first and the second optical receiver 450 and 460, and the monitor 470.

The WDM filter 420' reflects the first optical signal from the first lens 481 toward the second lens 482 and allows an injected light from the first lens 481 to pass through the filter 420', toward the polarization splitter 430'. In addition, the WDM filter 420' allows the second optical signal from the polarization splitter 430' to pass through the filter 420', toward the first lens 481.

The polarization splitter 430' splits the injected light from the WDM filter 420' into first and second polarization components, allows the first polarization component to pass through the splitter 430' toward the fourth lens 484, and reflects the second polarization component toward the third lens 483. In addition, the polarization splitter 430' splits the second optical signal from the fourth lens 484 at the predetermined ratio, thereby generating first and second power-divided lights. Then, the polarization splitter 430' outputs the reflected second power-divided light toward the fifth lens 485 and the transmitted first power-divided light toward the WDM filter 420'.

The fifth lens 485 collects the second power-divided light reflected from the polarization splitter 430'. The monitor 470 receives the collected second power-divided light and detects an electrical signal related to the second power-divided light. The monitor 470 detects the power of the second optical signal based on the power of the electrical signal. As a result, the monitor 470 monitors the operation state of the light injected transmitter 440 based on the power of the electrical signal.

Hereinafter, a procedure of processing an optical signal in the optical transceiver 500 will be described. The first optical signal from the optical fiber 410 is sent to the WDM filter 420' through the first lens 481. Then, the first optical signal is then reflected by the WDM filter 420' and is sent to the second optical receiver 460 through the second lens 482. The second optical receiver 460 detects an electrical signal related to the input first optical signal and de-modulates non-broadcasting data carried by the first optical signal.

The injected light from the optical fiber 410 is sent to the polarization splitter 430' through the first lens 481 and the WDM filter 420'. The polarization splitter 430' splits the injected light into a first and second polarization components, allows the first polarization component to pass through the splitter 430' toward the fourth lens 484, and reflects the second polarization component toward the third lens 483. The second polarization component having passed through the third lens 483 is received by the first optical receiver 450. The first optical receiver 450 then detects an electrical signal related to the second polarization component and de-modulates broadcasting data carried by the second polarization component. The first polarization component is sent to the light injected transmitter 440 through the fourth lens 484. The light injected transmitter 440 outputs a second optical signal that is generated by the first polarization component and modulated based on non-broadcasting data. The second optical signal is sent to the polarization splitter 430' through the fourth lens 484. The polarization splitter 430' power-divides the second optical signal into first power-divided light and second power-divided light. The first power-divided light is transmitted toward the WDM filter 420', and the second power-divided light is reflected toward the fifth lens 485. The reflected second power-divided light is sent to the monitor 470 through the fifth lens 485. The monitor 470 detects an electrical signal related to the second power-divided light, thereby monitoring the operation state of the light injected transmitter 440. The first power-divided light is sent to the optical fiber 410 through the WDM filter 420' and the first lens 481.

Figure 5:
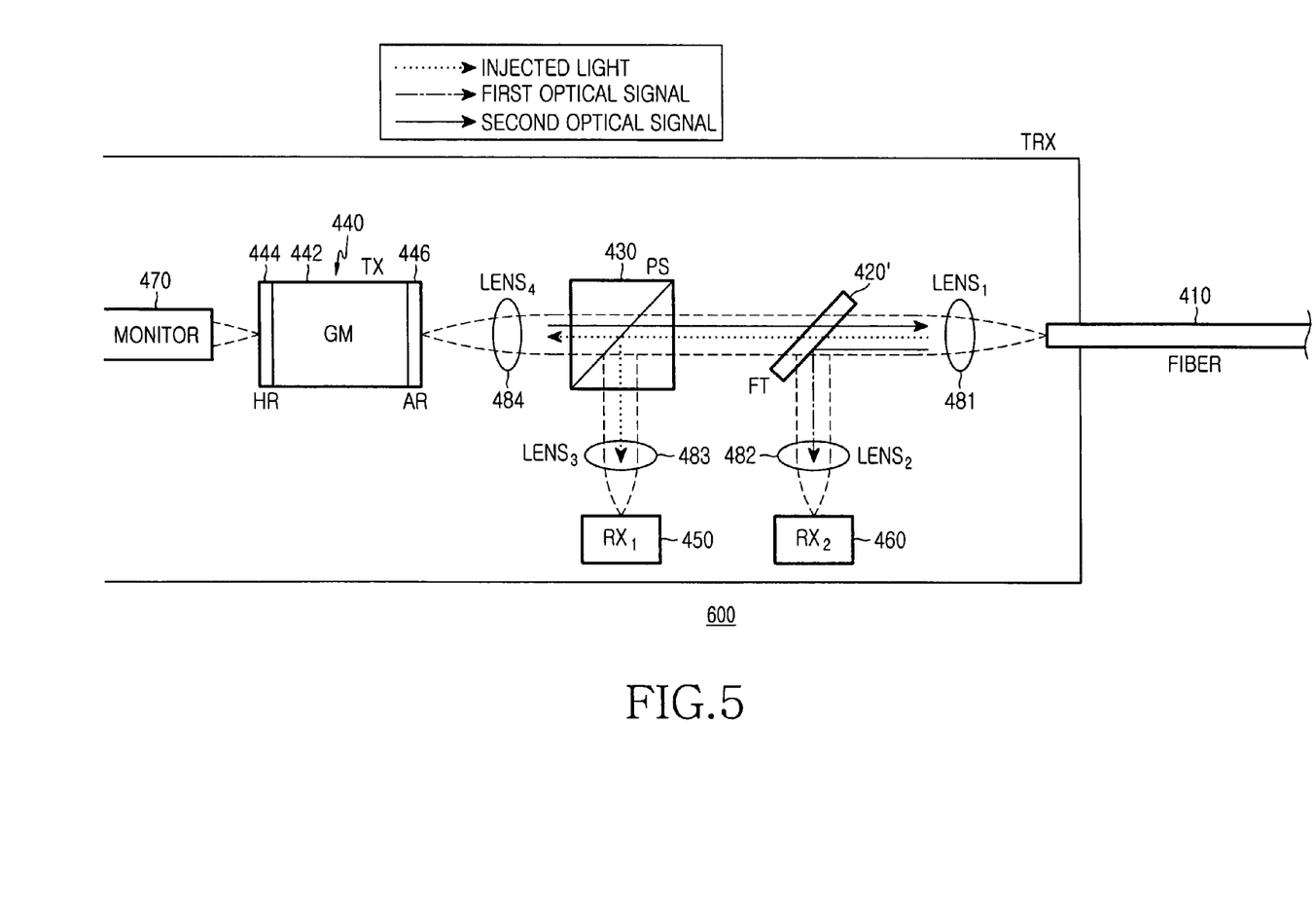
FIG. 5 is a view showing a structure of an optical transceiver according to another embodiment of the invention.

FIG. 5 shows a structure of an optical transceiver 600 according to another embodiment of the invention. Although position of the monitor 470 and function of a WDM filter 420' are different from those shown in FIG. 3, the optical transceiver 600 has a structure similar to that shown in FIG. 3. Accordingly, redundant description will be omitted, and the same components will be designated by the same reference numerals. The optical transceiver 600 includes the light injected transmitter 440, the first lens to the fifth lens 481 to 485, the polarization splitter 430, the WDM filter 420', the first optical receiver and the second optical receiver 450 and 460, and the monitor 470.

The WDM filter 420' reflects the first optical signal from the first lens 481 toward the second lens 482 and allows an injected light from the first lens 481 to pass through the filter 420' toward the polarization splitter 430. In addition, the WDM filter 420' allows the second optical signal from the polarization splitter 430 to pass through the filter 420' toward the first lens 481.

The monitor 470 is opposed to the high reflection layer 444 of the light injected transmitter 440. The monitor 470 receives light from the high reflection layer 444 of the light injected transmitter 440 and detects an electrical signal related to the light. The monitor 470 detects the power of the second optical signal based on the power of the electrical signal related to the second optical signal. As a result, the monitor 470 monitors the operation state of the light injected transmitter 440 based on the power of the electrical signal.

Hereinafter, a procedure of processing an optical signal in the optical transceiver 600 will be described. The first optical signal from the optical fiber 410 is sent to the WDM filter 420' through the first lens 481. Then, the first optical signal reflected from the WDM filter 420' is sent to the second optical receiver 460 through the second lens 482. The second optical receiver 460 detects an electrical signal related to the first optical signal and de-modulates non-broadcasting data carried by the first optical signal.

The injected light output the optical fiber 410 is sent to the polarization splitter 430 through the first lens 481 and the WDM filter 420'. The polarization splitter 430 splits the injected light into first and second polarization components, allows the first polarization component to pass through the splitter 430 toward the fourth lens 484, and reflects the second polarization component toward the third lens 483. The second polarization component, having passed through the third lens 483, is sent to the first optical receiver 450. The first optical receiver 450 detects an electrical signal related to the second polarization component and de-modulates broadcasting data carried by the second polarization component. The first polarization component is sent to the light injected transmitter 440 through the fourth lens 484. The light injected transmitter 440 outputs a second optical signal that is generated by the first polarization component and modulated based on non-broadcasting data. The second optical signal is sent to the optical fiber 410 through the fourth lens 484, the polarization splitter 430, the WDM filter 420', and the first lens 481.

As described above, an optical transceiver according to the present invention and a passive optical network using the same employ broadband light processed through non-intensity modulation based on broadcasting data. The transceiver improves a light injection efficiency greatly while providing broadcasting data and injected light to each optical network unit and constantly maintaining the intensity of the injected light input to a light injected transmitter.

While the invention has been shown and described with reference to certain preferred embodiments thereof, it will be understood by those skilled in the art that various changes in form and details may be made therein without departing from the spirit and scope of the invention. Consequently, the scope of the invention should not be limited to the embodiments, but should be defined by the appended claims and equivalents thereof.

What is claimed is:

1. An optical transceiver comprising:
    a polarization splitter for splitting injected light of the optical transceiver into a first polarization component and a second polarization component;
    a light injected transmitter containing a gain medium for receiving the split first polarization component and outputting an optical signal generated based on the first polarization component; and
    an optical receiver for detecting an electrical signal based on the split second polarization component.

2. The optical transceiver as claimed in claim 1, wherein the optical signal is output from a front end of the light injected transmitter, and
    the optical transceiver further comprises a monitor for detecting light output from a rear end of the light injected transmitter.

3. The optical transceiver as claimed in claim 1, wherein the optical transceiver further comprises a wavelength division filter for reflecting another optical signal input from outside along with the injected light.

4. The optical transceiver claimed in claim 3, wherein the filter has a reflectance of 0.1% to 10% with respect to the optical signal generated based on the first polarization component and 90% to 100% with respect to the other optical signal input from outside along with the injected light.

5. The optical transceiver as claimed in claim 1, wherein the light injected transmitter is a Fabry-Perot laser diode with a high reflection layer and an anti-reflection layer.

6. The optical transceiver as claimed in claim 5, wherein reflectance of the high reflection layer is 60% to 100% and the reflectance of anti-reflection layer is 0.1% to 30%.

7. The optical transceiver as claimed in claim 1, wherein the light injected transmitter is a reflective semiconductor optical amplifier with a high reflection layer and an anti-reflection layer.

8. The optical transceiver as claimed in claim 7, wherein reflectance of the high reflection layer is 60% to 100% and the reflectance of anti-reflection layer is 0.1% to 30%.

9. An optical transceiver comprising:
    a wavelength division filter for separating injected light and a first optical signal input from an outside of the optical transceiver;
    a polarization splitter for splitting the separated injected light into a first polarization component and a second polarization component;
    a light injected transmitter for receiving the split first polarization component and outputting a second optical signal generated based on the first polarization component;
    a first optical receiver for detecting an electrical signal based on the split second polarization component; and
    a second optical receiver for detecting an electrical signal based on the separated first optical signal.

10. The optical transceiver claimed in claim 9, wherein the wavelength division filter has a reflectance of 90% to 100% with respect to the first optical signal and 0.1% to 10% with respect to the second optical signal.

11. The optical transceiver as claimed in claim 9, wherein the wavelength division multiplexing filter receives the second optical signal and divides the second optical signal into first power-divided light and second power-divided light, and
    the optical transceiver further comprises a monitor for detecting the second power-divided light.

12. The optical transceiver as claimed in claim 9, wherein the polarization splitter receives the second optical signal and splits the second optical signal into first power-divided light and second power-divided light, and
    the optical transceiver further comprises a monitor for detecting second power-divided light.

13. The optical transceiver as claimed in claim 9, wherein the second optical signal is output from a front end of the light injected transmitter, and
    the optical transceiver further comprises a monitor for detecting light output from a rear end of the light injected transmitter.

14. A passive optical network comprising:
    a central office for outputting upstream broadband light processed through non-intensity modulation based on broadcasting data;
    a remote node for outputting the upstream broadband light by spectrum-dividing the input upstream broadband light; and
    a plurality of optical network units each for inputting corresponding spectrum-divided light,
    wherein each of the optical network units further includes:
    a polarization splitter for splitting input spectrum-divided light into a first polarization component and a second polarization component;
    a light injected transmitter for receiving the first polarization component and outputting an upstream optical signal generated based on the first polarization component; and
    an optical receiver for detecting an electrical signal based on the second polarization component.

15. The passive optical network as claimed in claim 14, wherein the central office further comprises: a wavelength division multiplexer, and a plurality of optical transceivers, wherein each transceivers further comprises: a downstream light injected transmitter, an upstream optical receiver, and a wavelength division multiplexer filter.

16. The passive optical network as claimed in claim 14, wherein the upstream optical signal is output from a front end of the light injected transmitter, and the passive optical network further comprises a monitor for detecting light output from a rear end of the light injected transmitter.

17. A passive optical network comprising:
a central office for outputting upstream broadband light processed through non-intensity modulation based on broadcasting data and multiplexed downstream optical signal processed through modulation based on non-broadcasting data;
a remote node for spectrum-dividing and outputting the input upstream broadband light and wavelength division de-multiplexing and outputting the input multiplexed downstream optical signal; and
a plurality of optical network units each for receiving corresponding spectrum-divided light and downstream optical signal,
wherein each of the optical network units includes:
a wavelength division multiplexing filter for dividing the input spectrum-divided light and the downstream optical signal;
a polarization splitter for splitting the divided spectrum-divided light into a first polarization component and a second polarization component;
a light injected transmitter for receiving the split first polarization component and outputting an upstream optical signal generated based on the first polarization component;
a first optical receiver for detecting an electrical signal based on the split second polarization component; and
a second optical receiver, for detecting an electrical signal based on the split downstream optical signal.

18. The passive optical network as claimed in claim 17, wherein the wavelength division multiplexing filter receives the upstream optical signal and divides the upstream optical signal into first power-divided light and second power-divided light, and
the passive optical network further comprises a monitor for detecting the second power-divided light.

19. The passive optical network as claimed in claim 17, wherein the polarization splitter receives the upstream optical signal and splits the upstream optical signal into first power-divided light and second power-divided light, and
the passive optical network further comprises a monitor for detecting the second power-divided light.

20. The passive optical network as claimed in claim 17, wherein the upstream optical signal is output from a front end of the light injected transmitter, and
the passive optical network further comprises a monitor for detecting light output from a rear end of the light injected transmitter.

* * * * *